United States Patent [19]

Marianowski et al.

[11] Patent Number: 5,071,718

[45] Date of Patent: Dec. 10, 1991

[54] USE OF SULFUR CONTAINING FUEL IN MOLTEN CARBONATE FUEL CELLS

[75] Inventors: Leonard G. Marianowski, South Holland; Gerald L. Anderson, Romeoville; Elias H. Camara, Clarendon, all of Ill.

[73] Assignee: Institute of Gas Technology, Chicago, Ill.

[21] Appl. No.: 546,504

[22] Filed: Jun. 29, 1990

Related U.S. Application Data

[63] Continuation of Ser. No. 31,109, Mar. 26, 1987, abandoned.

[51] Int. Cl.$^5$ .............................................. H01M 8/06
[52] U.S. Cl. ...................................... 429/16; 429/17; 429/20
[58] Field of Search .............................. 429/16, 17, 40

[56] References Cited

U.S. PATENT DOCUMENTS

| 4,548,876 | 10/1985 | Bregoli | 429/39 |
| 4,702,973 | 10/1987 | Marianowski | 429/41 |
| 4,925,745 | 5/1990 | Renick et al. | 429/40 |

FOREIGN PATENT DOCUMENTS

| 886164 | 11/1971 | Canada | 319/10 |
| 1051088 | 3/1979 | Canada | 319/17 |
| 1164043 | 3/1984 | Canada | 319/17 |
| 0092765 | 11/1983 | European Pat. Off. | |
| 0196465 | 10/1986 | European Pat. Off. | |
| 1571985 | 2/1971 | Fed. Rep. of Germany | |
| 1351190 | 3/1963 | France | |

OTHER PUBLICATIONS

Extended Abstracts, vol. 82-2, 1982, pp. 432–433, Pennington, New Jersey, U.S.; A. Pigeaud et al.; "Recent Developments in Porous Electrodes for Molten Carbonate Fuel Cells".

21st Intersociety Energy Conversion Engineering Conference, San Diego, Calif., 25th-29th Aug. 1986, pp. 1156-1162, American Chemical Society; R. J. Petri et al.; "Molten Carbonate Fuel Cell Component Design Requirements".

The Electrochemical Society, Inc., Spring Meeting, Montreal, 9th-14th May 1982, pp. 619-620, The Electrochemical Society, Inc., Pennington, New York, U.S.; S. H. Lu et al.; "Electrode Kinetics of Fuel Oxidation at Copper in Molten Carabonate".

Primary Examiner—Stephen J. Kalafut
Attorney, Agent, or Firm—Speckman & Pauley

[57] ABSTRACT

A process for production of electricity in molten carbonate fuel cells using a sulfur contaminated fuel gas wherein anode polarization is reduced by use of a porous anode of greater than about 10 weight percent copper resulting in improved fuel cell operation using fuel gas mixtures of over about 10 volume percent carbon monoxide and up to about 10 ppm hydrogen sulfide.

20 Claims, No Drawings

USE OF SULFUR CONTAINING FUEL IN MOLTEN CARBONATE FUEL CELLS

CROSS REFERENCE TO RELATED APPLICATION

This application is a continuation of copending application Ser. No. 07/031,109, filed Mar. 26, 1987 now abandoned.

BACKGROUND OF THE INVENTION

1. Field of the Invention

This invention relates to stable performance of molten carbonate fuel cells using sulfur containing fuels. Utilization of copper or copper alloy anodes in molten carbonate fuel cells increases tolerance to $H_2S$ containing fuels, as compared to nickel electrodes, thereby providing stable fuel cell operation using directly fuel obtained from gasification of naturally occurring organic carbonaceous materials, such as coal.

2. Description of the Prior Art

The use of molten carbonate fuel cells is well known for the conversion of chemical energy directly into electrical energy by a galvanic oxidation process. Molten carbonate fuel cells generally comprise two electrodes with their current collectors, a cathode and an anode, an electrolyte tile containing alkali metal carbonates making contact with both of the electrodes, and a cell housing to physically retain the cell components. Under fuel cell operating conditions, generally about 500° to about 700° C., the entire electrolyte tile, the carbonate and the inert support material, forms a paste and thus the electrolyte diaphragms of this type are known as "paste electrolytes". The electrolyte is in direct contact with the electrodes where the three-phase, gas-electrolyte-electrode, reactions take place. Further details of construction and operation of high temperature carbonate fuel cells is set forth in U.S. Pat. Nos. 4,009,321 and 4,247,604 and the references referred to therein, all incorporated herein by reference.

One desirably used fuel for molten carbonate fuel cells is a mixture of gases comprising principally hydrogen, carbon dioxide, and carbon monoxide as obtained by gasification of naturally occurring carbonaceous material such as coal, shale or peat, as well known in the art. Gas mixtures obtained by these processes usually contain sulfur contaminants, such as hydrogen sulfide. When using gasification products as fuel, due to their 10 to 35 volume percent carbon monoxide, it is desirable to shift the products to enhance the hydrogen content of the fuel within the fuel cell. The initial carbon monoxide to hydrogen water-gas-shift catalytic activity of a conventional nickel molten carbonate fuel cell anode or of an added nickel catalyst for production of additional hydrogen is quickly poisoned by the presence of sulfur containing chemicals. Molten carbonate fuel cell performance losses are known to be caused by contamination of the porous nickel anode by sulfides which may be present in impure fuel gases, such as may be obtained from gasification of naturally occurring organic carbonaceous materials, such as coal. See, for example, "Effects of $H_2S$ on Molten Carbonate Fuel Cells", Robert J. Remick, Process Report, U.S. Department of Energy Contract DE-AC21-83MC20212; DOE/MC/20212-2039 (DE 86010431) May 1986. Smith, S. W., Kunz, H. R., Vogel, W. M. and Szymanski, S. J., "Effects of Sulfur on Molten Carbonate Fuel Cells", (paper presented at Electrochemical Society Meeting, Montreal, Canada, May 1982), have reported complete failure of cell voltage in a molten carbonate fuel cell with a nickel anode when 2 ppm hydrogen sulfide, on a volume basis, was present in the fuel gas. The reduction in molten carbonate fuel cell performance to unsatisfactory levels with the presence of very small amounts of hydrogen sulfide in the fuel gas has been reported by several investigators: United Technologies Corporation, "Development of Molten Carbonate Fuel Cell Power Plant Technology", DOE/ET/15440-8 Quarterly Technical Progress Report No. 8, prepared for Department of Energy, under contract No. DE-AC01-79ET15440, February 1983; Vogel, W. M. and Smith, S. W., "The Effect of Sulfur on the Anodic $H_2$ (Ni) Electrode in Fused $Li_2CO_3$-$K_2CO_3$ at 650° C.", J. Electrochem. Soc, 129 (7) 1441–45 (1982); Tang, T. E., Claar, T. D., and Marianowski, L. G., "Effects of Sulfur-Containing Gases on the Performance of Molten Carbonate Fuel Cells", Interim Report EM-1699 prepared for Electric Power Research Institute by Institute of Gas Technology, February 1981; Sammells, A. F., Nicholson, S. B., and Ang, P.G.P., "Development of Sulfur-Tolerant Components for the Molten Carbonate Fuel Cells", J. Electrochem. Soc. 127, 350 (1980); and Claar, T. D., Marianowski, L. G., and Sammells, A. F., "Development of Sulfur-Tolerant Components for Second-Generation Molten Carbonate Fuel Cells", Interim Report EM-1114, prepared for the Electric Power Research Institute by Institute of Gas Technology, July 1969. A review of the effect of sulfur containing compounds on molten carbonate fuel cells is given in Marianowski, L. G., "An Update of the Sulfur Tolerance of Molten Carbonate Fuel Cells", paper presented at Third Annual Contaminant Control in Hot Coal Derived Gas Streams, Washington, Pa., May 1983. The expense of using pure hydrogen gas fuels is high as is the expense of sufficient removal of sulfur containing contaminants to a level which maintains satisfactory fuel cell operation with many conventional anode materials.

U.S. Pat. No. 3,431,146 teaches a molten carbonate fuel cell having a fuel electrode of nickel, cobalt, or iron, exhibits at least a temporary increase in power output by addition of hydrogen sulfide to a hydrogen fuel gas. In specific examples, this patent teaches 2.0 volume percent hydrogen sulfide added to hydrogen fuel gas increased power output by 50 percent during a one minute flow of the added hydrogen sulfide.

U.S. Pat. No. 4,404,267 teaches an anode composite for molten carbonate fuel cells wherein copper or nickel/copper alloy plated ceramic particles form a porous anode composite with a bubble pressure barrier adjacent the electrolyte tile, the pores being sized significantly smaller than the pores of the anode and sized to fill with electrolyte. U.S. Pat. No. 4,448,857 teaches a similar plated ceramic particle porous structure suitable for a cathode composite and U.S. Pat. Nos. 4,423,122 and 4,386,960 teach a similar plated ceramic particle porous structure for an electrode for a molten carbonate fuel cell and U.S. Pat. No. 4,361,631 teaches a method for production of such electrodes. U.S. Pat. No. 4,507,262 teaches a porous sintered copper blank plate affixed to the face of a porous anode wherein the pores are filled with metal oxide by use of an organometallic precursor to provide a bubble pressure barrier. U.S. Pat. No. 3,970,474 teaches electrochemical generation of power from carbonaceous fuels in a cell having a porous cathode of ceramic material coated with copper oxide. Copper oxide oxygen electrodes have been used in fuel cells as taught by U.S. Pat. No. 2,830,109.

SUMMARY OF THE INVENTION

The performance of molten carbonate fuel cells using nickel or nickel/chromium porous anodes has been found to degrade at least 10 mV per ppm $H_2S$ or similar sulfur compound in the fuel gas. The direct cause of the fuel cell degradation is not known. However, the catalyst poisoning has been found to occur under fuel cell operating conditions where the sulfur concentration ($pH_2S/pH_2$) is much less than required for bulk nickel sulfidation. Since the anode in a molten carbonate fuel cell operates in an environment quite different from and unique with respect to other catalytic reactions, predictability of sulfur poisoning cannot be made. Molten carbonate fuel cell anodes of this invention having an active water-gas-shift catalyst maintain a substantial proportion of their water-gas-shift catalytic activity when using fuels having up to about 10 ppm $H_2S$. The process of this invention using a porous anode of about 10 to 100 weight percent copper permits use of fuel obtained directly from gasification of carbonaceous material, such as coal, and containing carbon monoxide and up to about 10 ppm $H_2S$ to be subjected to in situ water-gas-shift and electrochemical reaction in the porous anode of an operating molten carbonate fuel cell.

It is an object of this invention to provide a process for improved operation of molten carbonate fuel cells using fuel gas mixtures directly from naturally occurring carbonaceous material gasification, such as coal gasification.

It is another object of this invention to provide a process for operation of molten carbonate fuel cells using fuel gases having carbon monoxide content of about 10 to about 35 volume percent.

It is yet another object of this invention to provide a process for operation of molten carbonate fuel cells in which a substantial portion of the carbon monoxide present in fuel gas mixtures is converted to additional hydrogen in the presence of up to about 10 ppm, on a volume basis, hydrogen sulfide by internal water-gas-shift reaction within the fuel cell.

It is still another object of this invention to provide a process for stable operation of a molten carbonate fuel cell in the presence of up to about 10 ppm $H_2S$ in the fuel gas by using porous metal anodes comprising copper, copper-nickel, copper-cobalt, and mixtures thereof.

It is another object of this invention to provide a process for internal water-gas-shift reaction for increased hydrogen fuel in a molten carbonate fuel cell in the presence of up to about 10 ppm $H_2S$.

These objects are achieved by using a porous metal anode comprising copper, copper-nickel, copper-cobalt, and mixtures thereof.

DESCRIPTION OF PREFERRED EMBODIMENTS

The coal gasification/molten carbonate fuel cell power plant may provide higher energy conversion efficiencies and lower emissions of critical pollutants than conventional coal fired generating plants with the stack gas scrubbing currently necessary for pollutant control. However, the presence of very low concentrations of hydrogen sulfide in the fuel gas substantially reduces the performance of the fuel cell. We have found the performance of molten carbonate fuel cells using 90 w/o Ni-10 w/o Cr anodes degrade at least about 10 mV per ppm of $H_2S$ in the fuel gas.

The operating temperature of the molten carbonate fuel cell corresponds with the temperature of raw fuel gas produced by coal gasifiers making it attractive to use the produced gas directly from the gasifier. Such fuel gas typically contains hydrogen, carbon monoxide, variable amounts of methane and other hydrocarbons, and diluents such as carbon dioxide, water and nitrogen. The hydrogen is the active fuel in the anode reaction zone of the molten carbonate fuel cell. Additionally, the carbon monoxide and hydrocarbons in the fuel gas may also be converted into electricity by being transformed into additional hydrogen within the fuel cell. The conduct of the water-gas-shift reaction in the anode zone of a molten carbonate fuel cell is very important when using fuel gas derived from naturally occurring carbonaceous materials since up to 50 percent of the chemical energy content of a coal derived fuel gas may be in the form of carbon monoxide. When carbon monoxide containing fuels are used in a molten carbonate fuel cell, the conduct of the water-gas-shift reaction is necessary to maintain performance characteristics and the operating voltage of the fuel cell. It is most desirable that the water-gas-shift reaction be carried out in situ in the anode zone of the operating molten carbonate fuel cell using the anode metal as the water-gas-shift catalyst.

It can be calculated using a typical low Btu coal derived fuel gas that at low fuel gas utilizations of less than 30 percent, the difference between a cell wherein the water-gas-shift reaction is at equilibrium as compared with a cell in which there is no water-gas-shift reaction, is less than 10 millivolts. However, as the fuel gas utilization approaches 64 percent, equivalent to 100 percent utilization of hydrogen and no utilization of carbon monoxide, the voltage of the cell in which the water-gas-shift reaction is poisoned, drops rapidly compared to the cell in which the water-gas-shift reaction continues at equilibrium. At 60 percent fuel gas utilization, the hydrogen in the anode exhaust from such a cell with no water-gas-shift reaction is 1.18 percent, while in the cell where the water-gas-shift reaction proceeds, the hydrogen content of the exhaust gas remains at 5.84 percent due to the additional hydrogen produced from the carbon monoxide present in the fuel gas mixture. These calculations are more fully explained in the publication "Effects of $H_2S$ on Molten Carbonate Fuel Cells" by Remick, R. J. and Anderson, G. L., work performed under contract No. DE-AC21-83MC 20212 by Institute of Gas Technology for U.S. Department of Energy, Office of Fossil Energy, January, 1985. Metal in the porous anode of a molten carbonate fuel cell or a separate catalyst material in the porous anode may serve as an in situ shift catalyst.

Molten carbonate fuel cells using porous nickel anodes exhibit loss of power and catalyst poisoning at fuel gas hydrogen sulfide concentrations ($pH_2S/pH_2$) well below those required for bulk metal sulfidation, such as, $2H_2S + 3Ni \rightarrow Ni_3S_2 + 2H_2$. Therefore, surface sulfide formation or sulfur absorption on the metallic surface which occurs at lower sulfur concentration ($pH_2S/pH_2$) is believed to be a cause of catalyst poisoning. Under reducing conditions of the anode, other gaseous sulfur compounds behave similarly to $H_2S$.

The stability of surface sulfides is significantly greater than bulk sulfides. This means that significantly lower ratios of $pH_2S/pH_2$ are required to form surface sulfides than are required to form bulk sulfides. (Advances in Catalysis, Volume 31, edited by D. D. Eley, Herman Pines and Paul B. Weisz, Academic Press, 1982, Sulfur Poisoning of Metal, C. H. Bartholomew, P. K. Agrawal and J. R. Katzer, pages 166-170). These references show that each bulk and surface sulfidation of nickel proceeds more readily than for copper. Comparison of the free energy changes during the sulfidation reaction at about 650° C., molten carbonate fuel cell operating temperature, shows:

|  | KJ | |
| --- | --- | --- |
|  | Bulk Sulfidation | Surface Sulfidation |
| Copper | −50 | −90 |
| Nickel | −80 | −160 |

In each case, surface sulfidation occurs more readily than bulk sulfidation. Based upon the above free energy changes, it is seen that bulk sulfidation of nickel may occur at about the same concentrations of $H_2S$ as may cause surface sulfidation of copper.

Lowering the free energy of formation of surface sulfides on anode surfaces under molten carbonate fuel cell operating conditions results in less anode polarization when hydrogen sulfide or other gaseous sulfur compounds are present. Use of copper containing anodes results in copper anode surfaces forming sulfides which are about 800 times less stable than nickel surface sulfides. Therefore, about 9200 times the concentration ($pH_2S/pH_2$) in the fuel gas is required to form similar sulfide surface coverage on a copper anode, as compared to a nickel anode. For example, under condition where ($pH_2S/pH_2$) for nickel surface sulfidation is 0.01 ppm $H_2S$, ($pH_2S/pH_2$) for copper surface sulfidation is in the order of 92 ppm $H_2S$. We have found copper anodes to be electrochemically similar to nickel anodes in operation of a molten carbonate fuel cell using sulfur-free fuel gas.

Porous metal molten carbonate fuel cell anodes functioning as catalysts for the electrochemical reaction and for internal water-gas-shift of carbon monoxide may preferably comprise an alloy, physical mixture, coating, or the like, of efficient water-gas-shift catalyst materials of nickel-copper or cobalt-copper, copper, and mixtures thereof. The anodes of this invention may contain about 10 to 100 weight percent metallic copper. Preferably, the anode metals are in proportions of about 40 to about 80 weight percent copper with the remainder being substantially nickel, cobalt, or mixtures thereof. By the terminology "the remainder being substantially", we mean the anodes of this invention may also contain lesser amounts of other additives, such as stabilizing agents of chromium or zirconium as taught by U.S. Pat. No. 4,247,604, as well as aluminum. The electrochemical properties of molten carbonate fuel cell anodes of such metals remain satisfactory. Pure copper anodes may be satisfactory from an electrochemical standpoint with greater carbon monoxide conversion to hydrogen taking place.

Molten carbonate fuel cells may be operated with fuel gases containing carbon monoxide and hydrogen sulfide with substantial retention of the in situ water-gas-shift reaction continuing in the anode zone with the nickel or cobalt anode material functioning as a catalyst when preferably about 40 to about 80 weight percent copper is physically mixed or alloyed with the nickel or cobalt or is incorporated on the active surface of a porous anode, the remainder being substantially a metal selected from the group consisting of nickel, coablt and mixtures thereof. Use of copper in conjunction with a more active water-gas-shift catalyst, such as preferably nickel, in the active porous metal anode of a molten carbonate fuel cell using a fuel containing hydrogen sulfide results in lowering the free energy of formation of surface sulfides with less anode polarization due to the hydrogen sulfide or sulfur containing compounds. During operation on carbon monoxide and hydrogen sulfide containing fuels, molten carbonate fuel cells according to this invention, provide substantial in situ conversion of carbon monoxide contained in fuel gas in amounts of generally from 10 to 35 volume percent to hydrogen, thereby providing additional hydrogen to the fuel gas to obtain cell voltages at sufficient operating levels. The process of molten carbonate fuel cell operation in accordance with this invention provides cell operation at below 700° C. and preferably about 500° to about 650° C. for conversion of a substantial amount of the carbon monoxide in the fuel gas to additional hydrogen. Generally, in excess of 25 volume percent and preferably in excess of 50 volume percent of the water-gas-shift reaction equilibrium production of additional hydrogen experienced with no hydrogen sulfide present, may be maintained when up to 5 to 10 ppm on a volume basis of hydrogen sulfide are present in the fuel gas. As hydrogen is consumed producing water vapor by the fuel cell electrochemistry, the water-gas-shift reaction which occurs on or within the anode itself may provide additional hydrogen for reaction so that with fuel comprising amounts of carbon monoxide present in gases from coal gasification, up to 105 to 115 percent hydrogen utilization may be effected by the fuel cell.

While the conventional anode gas phase residence time in molten carbonate fuel cells is typically about 1 second, we find it desirable to increase the anode gas phase residence time to greater than about 2 seconds and preferably the anode gas phase residence time is about 2 to about 4 seconds in the process of this invention to allow sufficient time for the water-gas-shift reaction to produce the desired additional hydrogen. The process of this invention provides the desired water-gas-shift reaction conversion of carbon monoxide to additional hydrogen in the anode zone when utilizing fuel gases having about 1 to about 10 and preferably about 1 to about 5 ppm by volume hydrogen sulfide.

Suitable anodes for use in the process of this invention may be prepared by the methods taught in U.S. Pat. No. 4,247,604, by known techniques utilizing tape casting layers followed by sintering, and by powdered metal techniques. The other fuel cell components and other operation processes taught by U.S. Pat. Nos. 4,009,321 and 4,247,604 are suitable for the fuel cells and processes contemplated by the present invention.

In a preferred embodiment according to this invention, a molten alkali metal carbonates fuel cell may be operated by passing fuel gas comprising hydrogen, about 20 to 25 percent volume percent carbon monoxide, and about 4 to 6 ppm $H_2S$ through a porous anode comprising about 50 weight percent copper and the remainder substantially comprising nickel. The anode is prepared by physically mixing copper and nickel powders and using powdered metal and sintering techniques known to the art for porous electrode preparation. The fuel cell is operated at about 650° C. and the fuel gas has a residence time in the anode zone of about 3 seconds. The cell may be operated over long periods of time without serious anode polarization while providing over about 25 volume percent of the water-gas-shift equilibrium conversion of CO to $H_2$ as obtained with no $H_2S$ present.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. In a process for the production of electricity in a molten alkali metal carbonates fuel cell using a fuel gas comprising hydrogen, about 10 to about 35 volume percent CO, and about 1 ppm to about 10 ppm $H_2S$ on a volume basis, the improvement comprising: passing said fuel gas through a porous anode comprising over about 10 weight percent copper with the remainder of said anode being substantially a metal selected from the group consisting of nickel, cobalt and mixtures thereof whereby over about 25 volume percent of the water-gas-shift equilibrium conversion of CO to $H^2$ obtained with no $H_2S$ present is maintained in the presence of said $H_2S$ by use of the anode metal as the sole water-gas-shift catalyst.

2. In the process for production of electricity of claim 1 wherein said anode comprises about 40 to about 80 weight percent copper; said fuel cell is operated below about 700° C.; and said fuel gas has a residence time in the zone of said anode for greater than about 2 seconds.

3. In the process for production of electricity of claim 2 wherein said remainder of said anode substantially comprises nickel and said fuel gas has a residence time in the zone of said anode for greater than about 2 seconds.

4. In the process for production of electricity of claim 3 wherein said fuel gas has a residence time in the zone of said anode of about 2 to about 4 seconds.

5. In a process of claim 1 wherein said anode comprises about 40 to about 80 weight percent copper.

6. In a process of claim 5 wherein said remainder of said anode substantially comprises nickel.

7. In a process of claim 5 wherein said copper is physically mixed with said metal.

8. In a process of claim 5 wherein said copper is alloyed with said metal.

9. In a process of claim 5 wherein said copper is surface coating said metal.

10. In a process of claim 1 wherein said fuel cell is operated below about 700° C.

11. In a process of claim 1 wherein said fuel cell is operated at about 500° to about 650° C.

12. In a process of claim 1 wherein said fuel gas has a residence time in the zone of said anode for greater than about 2 seconds.

13. In a process of claim 1 wherein said fuel gas has a residence time in the zone of said anode for about 2 to about 4 seconds.

14. In a process of claim 1 wherein said fuel gas comprises about 1 to about 5 ppm by volume $H_2S$.

15. A process for decreasing the formation of sulfides on surfaces of porous anode metal selected from the group consisting of nickel, cobalt and mixtures thereof under molten alkali metal carbonates fuel cell operation conditions when using a fuel gas comprising hydrogen, about 10 to about 35 volume percent CO, and about 1 ppm to about 10 ppm $H_2S$ on a volume basis, said process comprising passing said fuel gas through said porous anode having over about 10 weight percent copper in said anode, said anode metal being the sole water-gas-shift catalyst.

16. A process according to claim 15 wherein said anode comprises about 40 to about 80 weight percent copper; said fuel cell is operated below about 700° C.; and said fuel gas has a residence time in the zone of said anode for greater than about 2 seconds.

17. A process according to claim 15 wherein said copper is alloyed with said anode metal.

18. A process according to claim 15 wherein said copper is surface coating said anode metal.

19. A process for conduct of the water-gas-shift conversion of CO to $H_2$ in-situ in the anode of a molten alkali metal carbonates fuel cell using a fuel gas comprising hydrogen, about 10 to about 35 volume percent CO, and about 1 ppm to about 10 ppm $H_2S$ on a volume basis comprising passing said fuel gas through a porous anode comprising over about 10 weight percent copper with the remainder of said anode consisting essentially of a metal selected from the group consisting of nickel, cobalt and mixtures thereof whereby over about 25 volume percent of the water-gas-shift equilibrium conversion of CO to $H_2$ obtained with no $H_2S$ present is maintained in the presence of said $H_2S$.

20. A process according to claim 19 wherein said anode comprises about 40 to about 80 weight percent copper; said fuel cell is opreated below about 700°; and said fuel gas has a residence time in the zone of said anode for greater than about 2 seconds.

* * * * *